United States Patent
Lindberg

(10) Patent No.: US 10,471,639 B2
(45) Date of Patent: Nov. 12, 2019

(54) CONTROL METHOD FOR INJECTION MOULDING

(71) Applicant: TETRA LAVAL HOLDINGS & FINANCE S.A., Pully (CH)

(72) Inventor: Peter Lindberg, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 241 days.

(21) Appl. No.: 15/124,978

(22) PCT Filed: Mar. 11, 2015

(86) PCT No.: PCT/EP2015/055100
§ 371 (c)(1),
(2) Date: Sep. 9, 2016

(87) PCT Pub. No.: WO2015/136004
PCT Pub. Date: Sep. 17, 2015

(65) Prior Publication Data
US 2017/0021542 A1   Jan. 26, 2017

(30) Foreign Application Priority Data
Mar. 11, 2014  (SE) ...................................... 1450269

(51) Int. Cl.
*B29C 45/76* (2006.01)
*B29C 45/77* (2006.01)
*B29C 45/54* (2006.01)

(52) U.S. Cl.
CPC ............ *B29C 45/77* (2013.01); *B29C 45/542* (2013.01); *B29C 45/76* (2013.01);
(Continued)

(58) Field of Classification Search
None
See application file for complete search history.

(56) References Cited

U.S. PATENT DOCUMENTS

| | | |
|---|---|---|
| 3,865,913 A | 2/1975 | Lachner et al. |
| 4,949,001 A | 8/1990 | Campbell |

(Continued)

FOREIGN PATENT DOCUMENTS

| | | | |
|---|---|---|---|
| EP | 1 013 397 A1 | 6/2000 | |
| EP | 1013397 A1 * | 6/2000 | ............. B29C 45/54 |

(Continued)

OTHER PUBLICATIONS

Machine Translation of JP-2004291349-A.*

(Continued)

*Primary Examiner* — David P Turocy
(74) *Attorney, Agent, or Firm* — Buchanan Ingersoll & Rooney PC

(57) ABSTRACT

A control method for an injection moulding system having an extruder, feeding material continuously to an accumulator, portioning material intermittently to an injection device, wherein the control method is configured to drive the extruder at a high speed or at a low speed respectively, the high speed and the low speed defining an extruder speed interval, the method comprising acquiring a value for an actual positional change for the accumulator ($\Delta POS_{ACT}$), comparing the value for the actual positional change ($\Delta POS_{ACT}$) with a predicted value for the positional change ($\Delta POS_{PRED}$), and adjusting a speed of the extruder based on a result of the comparison.

9 Claims, 2 Drawing Sheets

(52) U.S. Cl.
CPC ............... *B29C 2945/76083* (2013.01); *B29C 2945/76207* (2013.01); *B29C 2945/76605* (2013.01); *B29C 2945/76665* (2013.01); *B29C 2945/76933* (2013.01); *B29C 2945/76946* (2013.01)

(56) References Cited

U.S. PATENT DOCUMENTS

| 2005/0019441 | A1  |        | 1/2005  | Seta et al. |
| 2012/0068373 | A1  | *      | 3/2012  | Craig ..................... B29C 45/54 264/40.6 |

FOREIGN PATENT DOCUMENTS

| JP | 2004-291349 A |   | 10/2004 |   |
| JP | 2004-291353 A |   | 10/2004 |   |
| JP | 2004291349 A | * | 10/2004 |   |
| JP | 2006-044184 A |   | 2/2006 |   |
| JP | 2006044184 A | * | 2/2006 | ............ B29C 45/18 |
| SU | 577951 A3 |   | 10/1977 |   |
| WO | WO 97/11829 A1 |   | 4/1997 |   |

OTHER PUBLICATIONS

International Search Report (PCT/ISA/210) dated May 21, 2015, by the European Patent Office as the International Searching Authority for International Application No. PCT/EP2015/055100.
Written Opinion (PCT/ISA/237) dated May 21, 2015, by the European Patent Office as the International Searching Authority for International Application No. PCT/EP2015/055100.
Swedish Office Action dated Sep. 24, 2014 by the Swedish Patent Office in Swedish Application No. 1450269-4 (7 pages).
An English Translation of the Search Report dated Aug. 31, 2018, by the Russian Patent Office in corresponding Russian Patent Application No. 2016139471/05(062999). (2 pages).

* cited by examiner

CONTROL METHOD FOR INJECTION MOULDING

TECHNICAL FIELD

The present invention relates to the field of injection moulding of plastic materials, and in particular to a control method usable in injection moulding.

TECHNICAL BACKGROUND

Injection moulding of plastics is a multi-stage process. The process as such is well known. Often the plastic material is supplied in the form of granules. According to one concept a batch of granules may comprise individual granules having a composition corresponding to the composition of the final product. According to another concept a batch may comprise various types of granules of different compositions such that the batch of granules on a whole has a composition corresponding to the composition of the final product.

The granules are fed to an extruder in which the granules are worked on, usually by means of an extruder screw operating continuously. The extrusion screw may be compared to a transport screw having a varying depth or pitch (or both) to induce an increased amount of frictional work on the granules, allow for trapped gases to be released etc. The design of extruders is a science in itself, and it is well outside the scope of the present specification to provide a detailed description.

The result of the extrusion process may be a melt, and this melt is then fed to an accumulator acting as a buffer between a continuously operating extruder and an intermittently operating injection device. The injection device injects the melt into a mould cavity and the melt sets, or freezes, in the mould cavity. The injection device consequently has a cyclic or intermittent operation in which it injects a melt to a cavity in one stroke, and receives a new melt from the extruder via the accumulator.

SUMMARY

To this end the present invention relates to a control method for an injection moulding system enabling improved control of the dynamics of plastic injection moulding.

According to a first aspect the disclosure relates to a control method for an injection moulding system having an extruder, feeding material continuously to an accumulator, portioning material intermittently to an injection device, wherein the control method is configured to drive the extruder at a high speed or at a low speed respectively, the high speed and the low speed defining an extruder speed interval. The method comprises acquiring a value for an actual positional change for the accumulator ($\Delta POS_{ACT}$) and comparing the value for the actual positional change ($\Delta POS_{ACT}$) with a predicted value for the positional change ($\Delta POS_{PRED}$) followed by adjusting a speed of the extruder based on a result of the comparison.

In one or more embodiment the low speed or the high speed is shifted or offset upwards or downwards by an increment thus generating a new low speed or a new high speed. In a related embodiment both the low speed and the high speed are shifted in the same direction, thus offsetting the entire extruder speed interval by an increment.

It may in one or several embodiments be preferable to acquire a value for the actual positional change in an intermittent manner, suggestively at the same time in each injection cycle, such that the values are comparable. The actual positional change may then be acquired by comparing values for adjacent measurement of a position of the accumulator.

The measurement does not necessarily have to be performed every injection cycle, it may instead be performed every second, third, fourth . . . etc cycle.

According to one or more embodiments the specific time is selected in the interval between the injection device being filled and the start of injection which is a time where e.g. the pressure variations in the system are not too significant.

Instead of merely shifting (or offsetting) the speed interval upwards or downwards an actual width of the interval may be adjusted such as too achieve a predetermined accumulator cycle time. This will be more thoroughly described in the detailed description.

According to another concept the disclosure relates to a control unit for an injection moulding system configured to perform the method according to one or more of the disclosed embodiments.

According to yet another aspect the disclosure relates to an injection moulding system incorporating a control unit configured to perform the method according to one or more of the embodiments disclosed.

DETAILED DESCRIPTION

Figure 1:
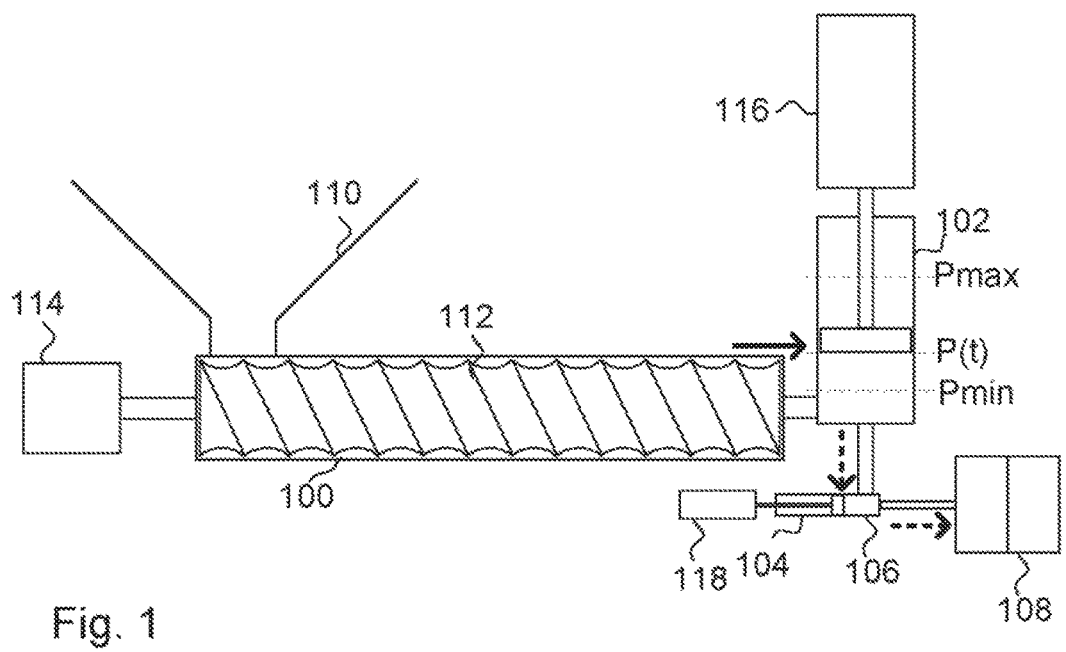
FIG. 1 is a schematic view of an injection moulding system.

FIG. 1 illustrates an injection moulding system. At 100 there is shown an extruder being fed granules and providing a continuous flow of melt to an accumulator 102, which in turn feeds an injector 104 having an injection cylinder 106. The injector injects a melt into a mould 108. The volume of the injection cylinder 106 is adapted to a volume required to fill the mould 108. Thus the injection cylinder is emptied fully in an injection stroke, and it is thereafter refilled from the accumulator 102. All of the components of the injection moulding system are schematically drawn and have little in common with the design of real components. The volume of the injection cylinder 106 is of course less than the volumetric capacity of the accumulator 102 and as the accumulator 102 is continuously fed by the extruder 100 the work of the injection cylinder will merely cause ripples in the graph showing the volume of melt present in the accumulator.

The feed of granules 110 to the extruder may typically be driven by gravitation, such that the plastic granules fall into the extruder. For the drive of the extruder screw 112 use may be made of an AC motor 114, typically frequency controlled, yet other alternatives exist, such as servo motor or hydraulic motor driven extruders. The accumulator may be driven by a pneumatic cylinder 116, or by other means. The actual injector may suitably be driven by a hydraulic driven cylinder 118, but alternative driving means having a similar performance may also be used. The manufacture of extruder screws is an art in itself, and each screw may have and individual performance to be accounted for.

In steady-state operation the behaviour of the system will be quite predictable, and under such conditions it could suffice that the accumulator could hold the volume of the injector and the amount of plastic fed out from the extruder while the injector is in an injection stroke, i.e. the accumulator could have a volume being roughly twice that of the injection cylinder 106. With "steady state operation" we mean that the injector injects plastic in moulds at a well defined and constant rate, making the operation of the system very predictable. In a practical case however, there will be variations in the speed of the injector, the most drastic one being if production comes to a sudden stop or, in the context of the technique being applied to a series of packaging container, if missed packages creates an unexpected time gap between injections. If this happens the extruder 100 will stop operating when the accumulator is filled to a certain level, yet even if the extruder stops the feed of plastic out of the extruder will continue for a while longer. For this and other reasons the volume of the accumulator is considerably larger than the volume of the injection cylinder. This could result in that in steady-state operation the accumulator is only using a very small part of a full stroke, e.g. being approximately quarter-full and only oscillating slightly around that position as a consequence of the operation of the injector and the feed from the extruder. Such an operation is however not desired since it may affect the quality of the plastic in the accumulator, e.g. in that portions of the melt remains in the accumulator for a long time, resulting in burning and degrading the plastic. The burnt and degraded residues may in itself result in quality issues in the produced item, and it may also result in that the burnt plastic hinders the accumulator motion when it actually needs to utilize other parts of the stroke.

It may therefore be advantageous if the accumulator is allowed to work a large portion of its maximum stroke, since it reduces the risk of unwanted phenomena in the plastic melt. For this reason the speed of the extruder 100 may be slightly varied, e.g. by the extruder having a high speed and a low speed. At the high speed the extruder 100 fills the accumulator 102 at a rate higher than the rate at which injector 104 injects the melt into the mould. The desired result is that the amount of plastic melt in the accumulator 102 will gradually increase until it reaches a maximum position, e.g. 50-60% of its maximum volumetric capacity. A reason for not setting the maximum position to e.g. 90% of the maximum volumetric capacity is to always have room for an unexpected stop. The position may be measured by a sensor (see indication in FIG. 1). At that point the extruder 100 may be switched to the low speed. When operated at the low speed the extruder 100 will feed the accumulator 102 at a rate being lower than the rate at which the injector 104 will inject the melt to the mould. The desired result at the low speed is that the amount of plastic in the accumulator will gradually be reduced until the accumulator reaches a minimum position, e.g. 20% of its volumetric capacity as measured by a sensor (see indication in FIG. 1). The use of a binary control system having a high speed and a low speed may be sufficient when dealing with a single plastic compound for a particular extruder where the high speed and low speed have been empirically deduced.

Figure 2C:
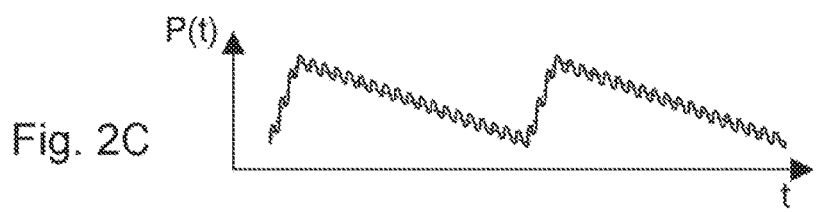
FIGS. 2A-C are schematic graphs illustrating the volume inside the accumulator as a function of time.
Figure 2B:
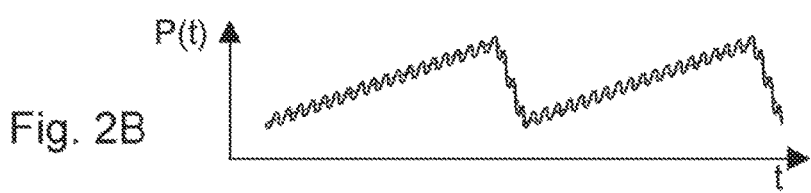
Figure 2A:
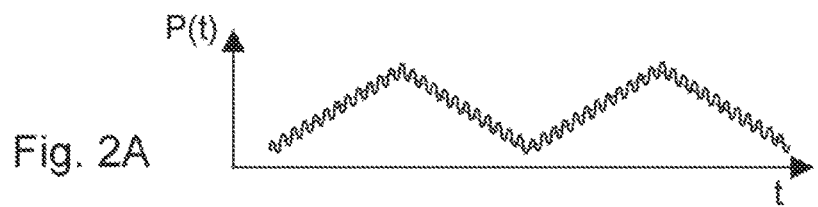

When the above control algorithm is working properly a graph as shown in FIG. 2A should be the result when plotting the accumulator position as a function of time. Starting form an empirically deduced steady-state speed the low speed and the high speed are positioned at equal distances from the steady state speed. In the graph the dotted line indicate the mean position of the accumulator (i.e. the volume of the accumulator occupied by the melt), and the thus formed zigzag curve indicates what may be referred to as the accumulator cycle. The overlying oscillating curve illustrates the small-scale variations in position caused by the intermittent transfer of melt from the accumulator to the injector, i.e. the injector cycle. In the graph of FIG. 2A the first segment corresponds to the extruder running at the high speed, thus filling the accumulator, and in the second segment the speed has shifted to the low speed and the accumulator starts being emptied. Thereafter the behaviour repeats itself cyclically. The cycle time may vary between systems, yet for the present application a cycle time of about a minute may be applicable for the accumulator. For practical purposes "half an accumulator cycle" and similar parameters may refer to the distance (in time or space) between two turning points for the accumulator. From the graph of FIG. 2B it is evident that the extension of half an accumulator cycle may vary, yet it may be preferred that the half cycle between an upper turning point and a subsequent lower turning point is of similar extension to half a cycle between a lower turning point and a subsequent higher turning point, the two forming a full accumulator cycle.

If the situation changes, e.g. if a new plastic compound is used or if the properties of the plastic granules varies, chances are that the high speed and the low speed, although covering the same interval, will be offset in relation to an optimal speed interval. In other words, the steady-state speed has shifted. The reason could be that the plastic will behave differently inside the extruder, that the plastic has different properties in terms of density, viscosity, temperature etc. No matter what the reasons are, however, possible effects are shown in FIG. 2B and FIG. 2C. In FIG. 2B the speed interval has been shifted downwards, rendering the high speed being too close to the steady-state speed, and the slow speed too far away from the steady state speed. In FIG. 2C the graph illustrates a situation where the speeds have been shifted upwards instead. The big difference in inclination indicates larger pressure differences in a high-speed situation as compared to a low-speed situation, and since pressure differences generates differences in the amount of plastic injected the appearance is undesirable. An even worse case would be when the speed interval does not even include the steady-state speed. In such a situation the accumulator would pass the maximum or minimum position, which would trigger a machine stop or at least an extruder short stop. A machine stop cause loss of production, an extruder stop might cause defect products that will increase the waste.

In the present disclosure a control method is provided. The control method enables for the above changes to occur without it leading to detrimental effects. In the control method the accumulator position is measured in a specific point once every injection cycle, once every two injection cycles, once every three injection cycles, or what is found appropriate. The injection cycle is related to the cyclic operation of the injector, and one full cycle may be expressed as 360°. The entire injection cycle is monitored by an automation system and therefore it is possible to extract the accumulator position at any instance of the injection cycle. The injection cycle is visible in FIGS. 2A-C as the small oscillations on the curve. Looking at the operation of the injector it injects the melt rapidly and then it is refilled. After being refilled it waits for fractions of a second before repeating the injection. It has been found that a suitable time for acquiring a reliable value for the accumulator position is during this waiting period, and that would then correspond to the "specific point" as defined above. It is however possible to acquire a value of the position at any time during the injection cycle and the present disclosure should not be limited in that aspect.

Knowing the desired cycling time for the accumulator (not the injection cycle but the longer accumulator cycle in which it travels between a maximum position and a minimum position, which in the above example was in the order of a minute) it is possible to predict how much the accumulator position should change between consecutive measurements. The predicted parameter will be denoted $\Delta POS_{PRED}$, and the change as actually measured will be denoted $\Delta POS_{ACT}$.

Figure 3:
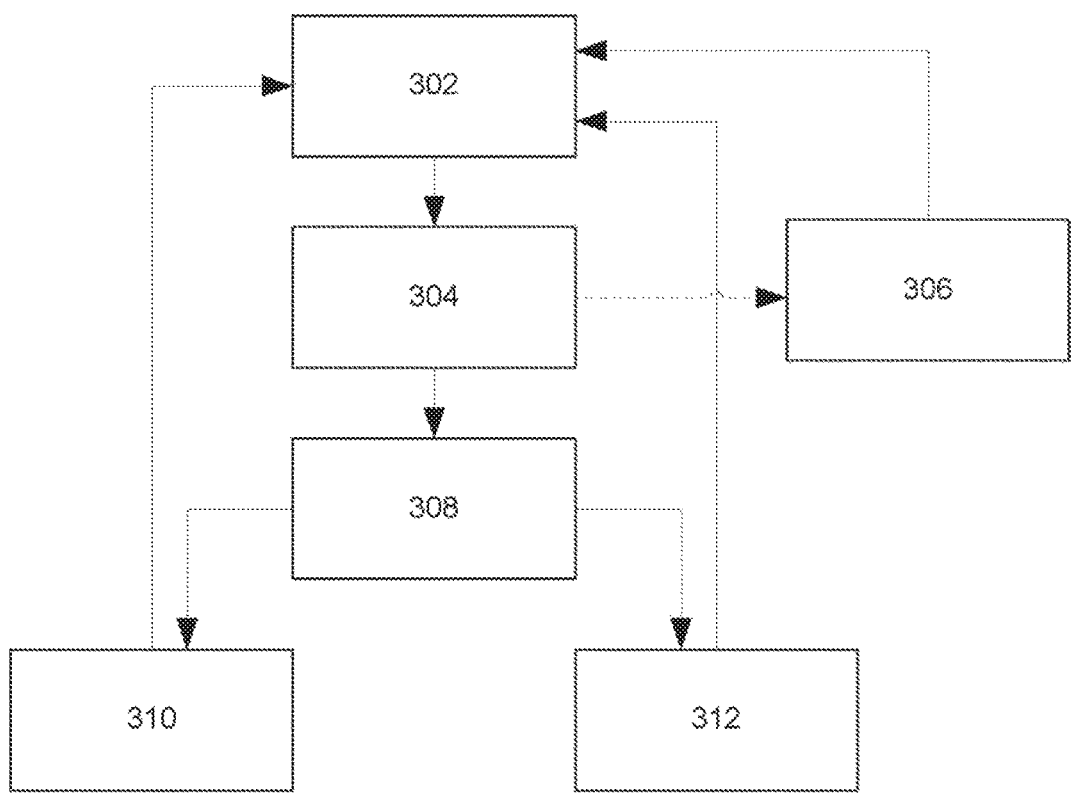
FIG. 3 is a flow schedule illustrating a method according to one embodiment.

According to the control method the change in accumulator position as measured is compared to the change is accumulator position as predicted. If the values differ, appropriate action is taken. FIG. 3 illustrates one embodiment of such a control method. Since there are several alternatives FIG. 3 actually exemplifies several embodiments.

In step 302 a reading of the actual accumulator position is compared with a previous reading of the accumulator position, a difference is calculated and resulting actual change in accumulator position $\Delta POS_{ACT}$ is compared to a predicted change in accumulator position $\Delta POS_{PRED}$. There are of course many ways for actually making the comparison, and the skilled person studying the present disclosure realizes this, the basic issue being comparing an actual position change with a predicted or desired position change.

We will come back the step 304 after describing the rest of the method.

In step 308 it is determined whether $\Delta POS_{ACT}$ is smaller than or larger than $\Delta POS_{PRED}$. If it is smaller a suitable action is taken in step 310. A suitable action in step 310 may be to increase the extruder speed with an increment. Another suitable action may be to shift the entire extruder speed interval, as defined by the low speed and the high speed, upwards by an increment. These two actions may be taken at once in order to take care of an immediate issue and to make a change on a longer term at the same time. If the actual positional change it is larger than the predicted or expected positional change a suitable action is taken in step 312. A suitable action in step 312 may be to lower the extruder speed by an increment, shift the entire speed interval downwards by an increment, to make both changes, or to take no action. Both step 310 and step 312 leads back to step 302.

Returning to step 304; in this step it is determined whether the accumulator is inside its interval of motion or not. There is a maximum position which should not be exceeded. This maximum position is set to allow for the accumulator to receive melt from the extruder for a short while in a situation where the after the extruder has stopped due to the downstream process (the injection moulding) has been halted. There is also a minimum position preventing the accumulator to run dry of melt. For the purposes of the present disclosure the actual positions are less relevant, though the actual settings will trigger the shift from lower speed to higher speed and vice versa. Apart from the maximum/minimum positions there are also stop positions. The stop positions lies outside of the interval defined by the maximum and minimum position respectively. Should the accumulator reach these positions it is an indication of that there is a more significant problem, and depending on the nature of the event the parts of the system will be shut down. If the maximum stop position is reached the extruder will stop, and if a minimum position is reached the process downstream and including the accumulator may be halted.

If the accumulator position is outside of its interval of motion as defined by the maximum position and the minimum position the method enters step 306 for suitable action. A suitable action in step 306 may be to shift the extruder speed from high to low or from low to high depending on the situation, i.e. depending on if the maximum position or the minimum position has been reached. When shifting the speeds, which is done in what may be referred to as turning points, the shift is preferably switched in a binary manner from the end of the speed interval defined by the higher/lower speed to other end of the interval defined by the lower/higher speed. Up to the turning point the speed and or the entire interval has been regulated by the control method, and the assumption is that the speed when reaching the turning point corresponds to an optimum speed for obtaining the best motion pattern for the accumulator. The speed will then shift to the other optimum speed at the other end of the interval. If this is not the case the control method will adjust the speed accordingly.

The previous embodiments have described optimization of the position for an extruder speed interval where the extension of the interval is known or preset. This may often suffice, provided that the interval has been set on empirical data. In one further embodiment a step of optimizing the speed interval may be included. In this step the actual speeds at the turning points may be used as input and be correlated to e.g. the actual cycle time for the accumulator position. In another embodiment the only input is the actual cycle time for the accumulator position, and in still other embodiments the time for half a cycle may be utilized. If the cycle time is shorter than a desired cycle time the speed interval may be decreased by an increment, resulting in a lowered high speed and an increased low speed, and if the cycle time is longer than a desired cycle time the speed interval may be increased by an increment. According to these and similar embodiments the speed shift at the turning point may be even more successful in finding the correct speed at once.

In yet another embodiment the control method is simplified to a rudimentary level, which still is similar to the embodiments disclosed thus far. In this embodiment the width of the speed interval is defined in advance, and the extruder, and the rest of the system, is controlled for a specified period of time, e.g. 10 min, using any embodiment as disclosed in the present specification. After that specified period of time a mean extruder speed is calculated and the speed interval is centered around that mean extruder speed. Subsequently the elaborate control method is inactivated and it is condensed into switching between the low speed and the high speed as defined during the specified period of time. In a related embodiment, describing a mode of operation that may be applied to any or all embodiments, the control method will after the specified period of time (such as 5 min, 10 min, or any suitable limited period of time) will use the mean extruder speed as a baseline speed for the subsequent control method. In a practical case this could mean that after the specified period of time the mean extruder speed is set to 0 (as in 0 offset from a mean speed). The high speed may then be set to +4 (4 units above the mean speed, e.g. 4 Hz above the drive frequency) and the low speed may be set to −4 (4 units below the mean speed). There may also be preset a range limit, e.g. that the speed may not vary more than +/−8 units from the mean speed. The range limit may be a separate feature that may also be used in all embodiments, having the purpose of making the control algorithm arriving at correct mean speed faster and to reduce the risk of the control algorithm reacting in an unwanted way to events beyond its actual control. Exemplifying the latter with a simple example: If there is a blockage in the granule flow upstream the accumulator the algorithm would instruct the extruder to increase the speed one increment by one. If the speed range was not adopted (or another limiting parameter)

it would continue to do so, consequently it could reaching very high speeds. Once the blockage is released (or someone adds more granules in the event that the reason is a lack of granules upstream the extruder) the speed would be far off the preferred range.

Returning to a more general aspect; as the speed is shifted another suitable action may be to disable the control loop for a defined number of injection cycles, before it is restarted. This may be done in order to allow for the new situation to stabilize, and it basically only applies in the turning points.

When used the disclosed control method according to any embodiment thereof it will essentially center the steady-state speed of the extruder between the high speed of the extruder and the low speed of the extruder, such that the accumulator will be exercised over a predetermined interval of motion in a predetermined cyclic manner. The control method will account for changes in the feeding behaviour of the extruder to the accumulator disregarding the reason. This will have the effect that the plastic pressure in the system will be more stable which leads to that the defined amount of plastic that should be injected by the injector at all times will be more accurate, to the benefit of system performance. In a well functioning system changes in behaviour may be an effect of a change in plastic compound fed to the extruder, which will be automatically accounted for by the disclosed control method. Normal wear of the components may also affect the plastic feed, and this is also accounted for by the disclosed control method. Using a control method according to the present disclosure may result in that the turning point in the extruder cycle varies with less than 20% (up or down) from half the extruder cycle, i.e. that the turning point occurs in an interval of 30-70% of a full extruder cycle, it may also vary by 15%, 10%, 5% or even as little as 1-2%.

The extruder screw may be driven by an AC motor. In such a case incremental changes in the extruder speed may be effected by altering the drive power by increments of 1 Hz. There are obviously other types of drive systems that may be controlled in other ways.

A method and system according to the present disclosure may be used for many injection moulding applications, one example being injection moulding of components used in connection to packaging containers. An entire packaging container may be injection moulded (such as plastic bottle), a portion of a packaging container may be injection moulded (such as the plastic top of a "carton bottle"), or a part of a packaging container may be injection moulded (such as an opening device). For packaging containers of the "carton bottle" type two examples exist in the Tetra Top® packaging container and the Tetra Evero Aseptic® packaging container provided by the present applicant. For these packaging containers a plastic top, with or without an opening device, is moulded to a sleeve made of packaging laminate. The packaging laminate may have a core of paper material or other fibrous material, such as carton providing rigidity to the packaging container, and laminated thereto a number of additional layers of e.g. polyamide, polyethylene, aluminium etc. providing sought-for barrier properties. Common features of moulded plastic components used for packaging containers are that they should deliver a performance at the lowest possible cost (as little plastic material should preferably be used), since billions of packages are manufactured each year. When the packaging container contains foodstuff the performance of the moulded plastic components may be particularly delicate, since any failure in performance may affect the contained product in a negative way. The injection moulding also have to be fast, the cycle rate being at about 5000-15000 packaging containers per hour, and the moulded plastic component may be thin to enable short cooling times (and a low plastic consumption). All in all, for injection moulding performed in the food industry there is a very low acceptance in errors by necessity, while at the same time the margin for successful result is limited by sometimes contradicting issues such as performance, cost, environmental impact, etc. In that context the present application does not disclose a solution to all issues, yet still, the contribution made will constitute a significant improvement enabling further fine tuning of an injection moulding process and in providing a stable and reliable result.

From automation point there may be several ways to enable the control method as disclosed herein. Without going in to too much detail, and by means of example only, the accumulator may be equipped with an analogue position sensor and the extruder may be driven by a frequency inverter or speed servo. The machine cycle time between injections may preferably be constant so that the accumulator position can be registered at the same time inside the machine cycle every time. The control algorithm as such may be created in more or less any of the IEC61131-3 programming languages. A sample time for the algorithm can be as long as 50 ms without any problem. Hardware for realizing the control method in a control unit in an actual situation may be optimized for a particular environment but in any case it should be readily available.

The invention claimed is:

1. A method for controlling a speed of an extruder in an injection moulding system the method consisting of:
   feeding material continuously to an accumulator via the extruder, the extruder being driven at a first speed or at a second speed, wherein the second speed is greater than the first speed, and the first speed and the second speed define an extruder speed interval;
   acquiring an actual positional change for the accumulator;
   comparing the actual positional change with a predicted positional change; and
   adjusting a speed of the extruder based on the comparison by shifting the first speed or the second speed by an increment to generate a new first speed or a new second speed of the extruder.

2. The method of claim 1, comprising shifting the extruder speed interval by an increment, thus shifting both the first speed and the second speed by an increment thus generating a new first speed and a new second speed and a new extruder speed interval.

3. The method of claim 1, comprising acquiring the actual positional change intermittently.

4. The method of claim 3, wherein the acquisition is performed at a specific time during an injection cycle every nth, wherein n is an integer between 1 and the number of injection cycles during half an accumulator cycle.

5. The method of claim 4, wherein the specific time is found in the interval between the injection device being filled and the start of injection.

6. The method of claim 1, comprising acquiring the actual position of the accumulator and selectively shifting the first speed to the second speed or vice versa if the actual position of the accumulator is outside a predetermined positional interval.

7. The method of claim 1, comprising adjusting a width of the extruder speed interval for achieving a predetermined accumulator cycle time.

8. A control unit for an injection moulding system configured to perform the method according to claim 1.

9. An injection moulding system including a control unit according to claim 8.

* * * * *